US005450727A

United States Patent [19]
Ramirez et al.

[11] Patent Number: 5,450,727
[45] Date of Patent: Sep. 19, 1995

[54] THERMOELECTRIC COOLER CONTROLLER, THERMAL REFERENCE SOURCE AND DETECTOR

[75] Inventors: Michael J. Ramirez, Torrance; Joe A. Ortiz, Garden Grove, both of Calif.

[73] Assignee: Hughes Aircraft Company, Los Angeles, Calif.

[21] Appl. No.: 250,249

[22] Filed: May 27, 1994

[51] Int. Cl.6 ............................................. F25B 21/02
[52] U.S. Cl. ................................... 62/3.7; 165/26
[58] Field of Search ........................... 62/3.7; 165/26; 307/310

[56] References Cited

U.S. PATENT DOCUMENTS 3,304,726  2/1967  Beck .......................... 62/3.7
3,330,970  7/1967  Wennerberg et al. ............. 62/3.7 X
4,364,234  12/1982  Reed .......................... 62/3.7

Primary Examiner—William E. Wayner
Attorney, Agent, or Firm—Hugh P. Gortler; Michael W. Sales; Wanda K. Denson-Low

[57] ABSTRACT

A thermoelectric cooler controller, a thermal reference source employing the controller, a thermal reference source, and a thermal calibration system. The controller controls the temperature of a thermoelectric cooler. The controller includes a temperature sensor coupled to the thermoelectric cooler that provides a temperature feedback signal. An error amplifier compares a temperature command (TEMP CMD) with a feedback signal and generates a positive polarity output current command signal (VCMD). A current driver is coupled to the error amplifier for providing an output current equal to one-half the current command signal. An H-bridge circuit is coupled between the current driver and the thermoelectric cooler for switching the direction of current flow in the thermoelectric cooler, thus heating and cooling it. A comparator is coupled to the error amplifier and the H-bridge circuit, for controlling the current supplied by the H-bridge circuit to the thermoelectric cooler. The thermal reference source comprises the thermoelectric cooler and the above-described controller. The detector system includes a detector, and the thermal reference source and controller. The thermal calibration system comprises the detector, the thermoelectric cooler for providing heat output to the detector, and the thermal reference source and controller.

28 Claims, 4 Drawing Sheets

THERMOELECTRIC COOLER CONTROLLER, THERMAL REFERENCE SOURCE AND DETECTOR

BACKGROUND

The present invention relates to thermal detection systems, and more particularly, to a thermoelectric cooler controller, a thermal reference source employing the controller, a detector system employing the thermal reference source and controller, and a thermal calibration system.

The assignee of the present invention designs and manufactures thermal imaging systems that employ thermal reference sources in its image detection systems. Such thermal imaging systems have heretofore employed a thermoelectric cooler driver that included a controller for a thermal reference source. The prior controller employed in such thermal imaging systems to control the thermal reference source does so by changing the voltage supplied to the thermal reference source.

The above-described and previously employed controllers for the thermal reference source use a voltage to drive the thermal reference source. The output stage of the controllers is a power amplifier that requires high current bipolar power inputs. Voltage control can lead to dithering about the intended temperature, since a thermal reference source is best defined as a current controlled device.

It is an objective of the present invention to provide for an improved thermoelectric cooler controller, a thermal reference source employing the controller, a detector system employing the thermal reference source and controller, and a thermal calibration system, that overcome the problems of prior designs.

SUMMARY OF THE INVENTION

In order to meet the above and other objectives, the present invention provides for a thermoelectric cooler controller, a thermal reference source employing the controller, and a detector system employing the thermal reference source and controller, and a thermal calibration system. The thermoelectric cooler controller provides a means for controlling the temperature of a thermoelectric cooler. The thermoelectric cooler controller comprises a temperature sensor coupled to the thermoelectric cooler that provides a temperature feedback signal. An error amplifier is provided for comparing a temperature command (TEMP CMD) with a feedback signal and generates a positive polarity output current command signal (VCMD). A current driver is coupled to the error amplifier for providing an output current equal to one-half the current command signal. An H-bridge circuit is coupled between the current driver and the thermoelectric cooler for switching the direction of current flow in the thermoelectric cooler, thus heating and cooling it. A comparator is coupled to the error amplifier and the H-bridge circuit, for controlling the current supplied by the H-bridge circuit to the thermoelectric cooler.

The thermal reference source comprises the thermoelectric cooler and the above-described controller. The detector system includes a detector, and the thermal reference source and controller. The thermal calibration system comprises a detector, a thermoelectric cooler for providing heat output to the detector, and the thermal reference source and controller.

The controller comprises a switching converter that provides current to a thermal reference source. The switching converter derives its high power output solely from a unipolar source. This eliminates the need for power conversion to supply high power, bipolar voltages. Since most thermal reference sources operate from a +28 volt input power source, efficiency increases because the current-source current comes directly from this input power source, and bipolar bias voltages can now be limited to very small switching regulators.

More particularly, the present invention is a controller that provides a current that controls the temperature of the thermal reference source using a bidirectional current source. The current source is constructed by utilizing a switching converter powered by a single positive voltage source. The thermoelectric cooler cools when current applied thereto flows in one direction, and heats when current flows in the opposite direction. Bidirectional temperature movements (heating-/cooling) are accomplished by switching the direction of the output current flow by means of an H-bridge circuit. Heating-to-cooling transitions, and vise-versa, are accomplished at zero output current, preventing stress to the driver circuits and the thermoelectric cooler.

In operation, the thermoelectric cooler temperature (VTEMP) is sensed and compared with a temperature set point (VSET). The temperature set point is the average of a pulsewidth modulated signal. The rectified error signal is fed into a buck converter circuit, which is configured as a current source. The output current is proportional to the amplitude of the error signal. This output current is switched through the thermoelectric cooler by an H-bridge. The direction of current flow is determined by a comparator, which turns on one set of field effect transistors when VSET is greater than VTEMP, and the other of field effect transistors when VTEMP is greater than VSET.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
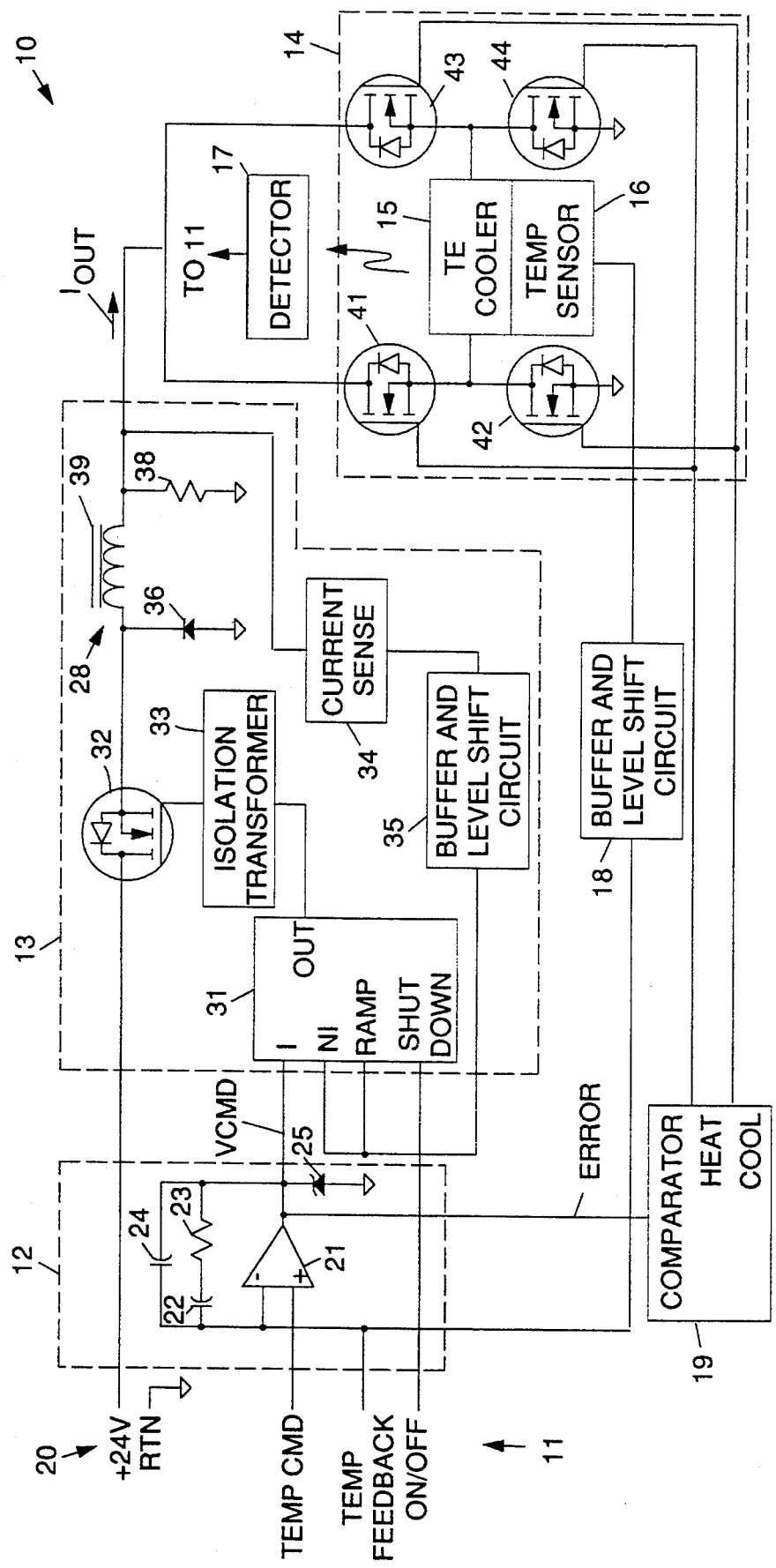
FIG. 1 illustrates a controller in accordance with the principles of the present invention for controlling the temperature of a thermoelectric cooler and that may be used to calibrate a detector.

Referring to the drawing figures, FIG. 1 illustrates a controller 10 in accordance with the principles of the present invention for controlling the temperature of a thermoelectric (TE) cooler 15. The controller 10 is comprised of a number of circuits, including an error amplifier 12, a current driver 13, an H-bridge circuit 14, a temperature sensor 16, a buffer and level shift circuit 18, and a comparator 19, interconnected as shown. The controller 10 may be used to control the temperature of the thermoelectric cooler 15 which in turn is used as a thermal reference source to calibrate a detector 17. A thermal imaging system process controller interface 11 is shown for reference.

The controller 10 shown in FIG. 1 represents one half of a preferred embodiment that has been reduced to practice. This preferred embodiment includes two independent circuits as shown in FIG. 1 that are coupled to the process controller interface 11 in the manner shown in FIG. 1. The second circuit controls power to a second thermoelectric cooler which may be used to calibrate a second detector, for example.

The process controller interface 11 provides a unipolar voltage source 20 (+24V, for example, and ground return) that provides power for the controller 10. The process controller interface 11 couples a temperature command (TEMP CMD) output signal that determines a temperature set point that is the desired temperature of the thermoelectric cooler 15 and of the detector 17. The process controller interface 11 also receives a temperature feedback signal from the temperature sensor 16, by way of the buffer and level shift circuit 18.

The error amplifier 12 is comprised of an operational amplifier 21, that includes a resistor 23 and two capacitors 22, 24 that are used to set gain. A current command clamp circuit 25, represented by a Zener diode 25 in FIG. 1 is coupled to the output of the operational amplifier 21.

The current driver 13 is comprised of a pulsewidth modulation circuit 31 that is used to control a MOSFET switch 32, an isolation transformer 33 coupled between the pulsewidth modulation circuit 31 and the MOSFET switch 32, and a current sense circuit 34 that is coupled from the output of the driver (OUT1) through the buffer and level shift circuit 35 to inputs of the pulsewidth modulation circuit 31 to provide current feedback, interconnected as shown. The output of the MOSFET switch 32 is coupled through a filter 28 that comprises a diode 36, capacitor 37, resistor 38 and an inductor 39, coupled as shown.

The H-bridge circuit 14 is comprised of two pairs of MOSFET switches 41, 42, 43, 44 that are coupled between the output of the current drive circuit 13 and inputs of the thermoelectric cooler 15. The temperature sensor 16 is coupled to the thermoelectric cooler 15 and provides a temperature feedback signal that is coupled by way of the buffer and level shift circuit 18 to the operational amplifier 21 of the error amplifier 12. Input signals to each of the MOSFET switch 41, 42, 43, 44 are coupled from the comparator 19 which senses whether to heat or cool.

Figure 2:
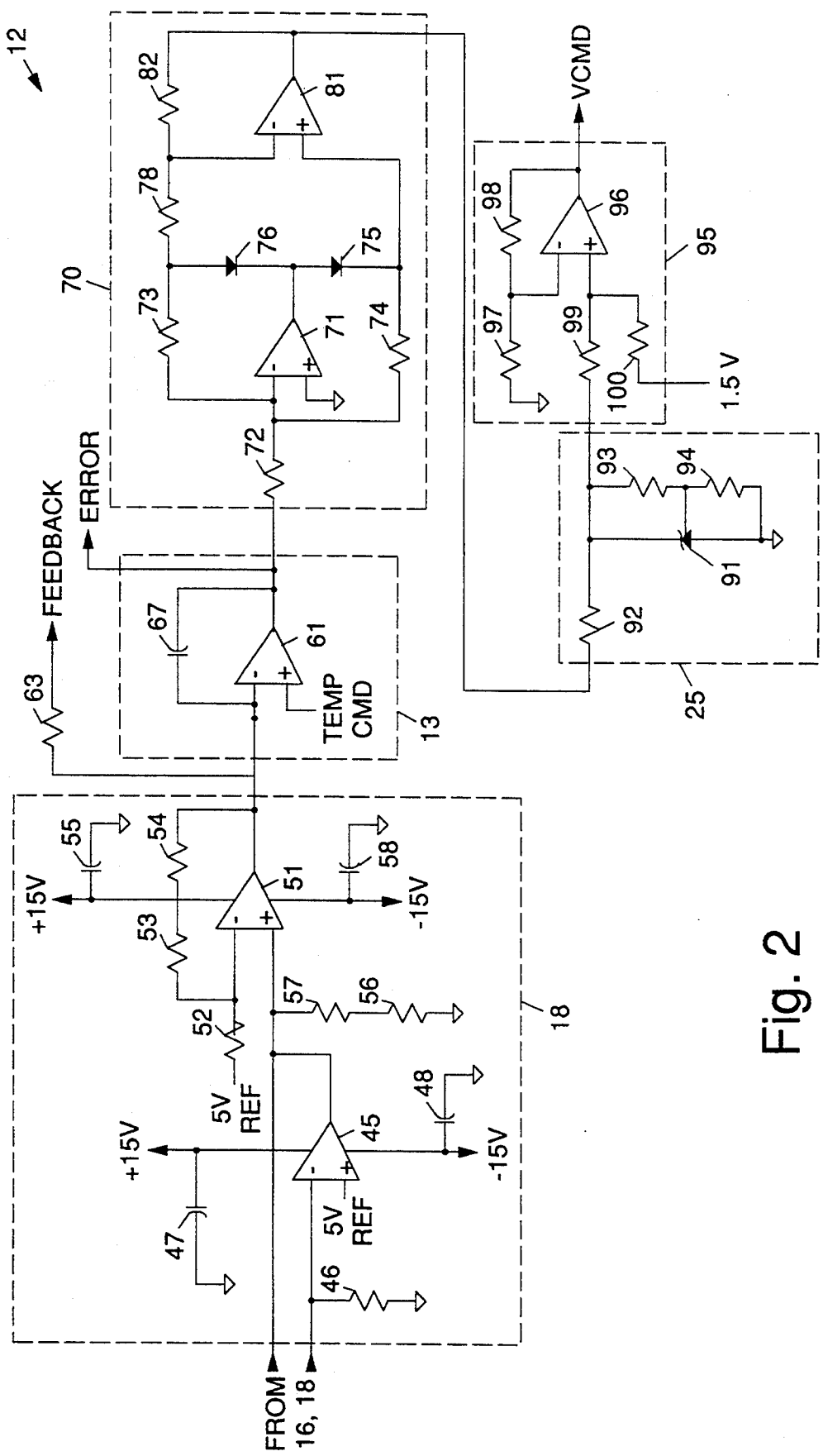
FIG. 2 illustrates a detailed diagram of the buffer and level shift circuit and error amplifier of the controller of FIG. 1.
Figure 3:
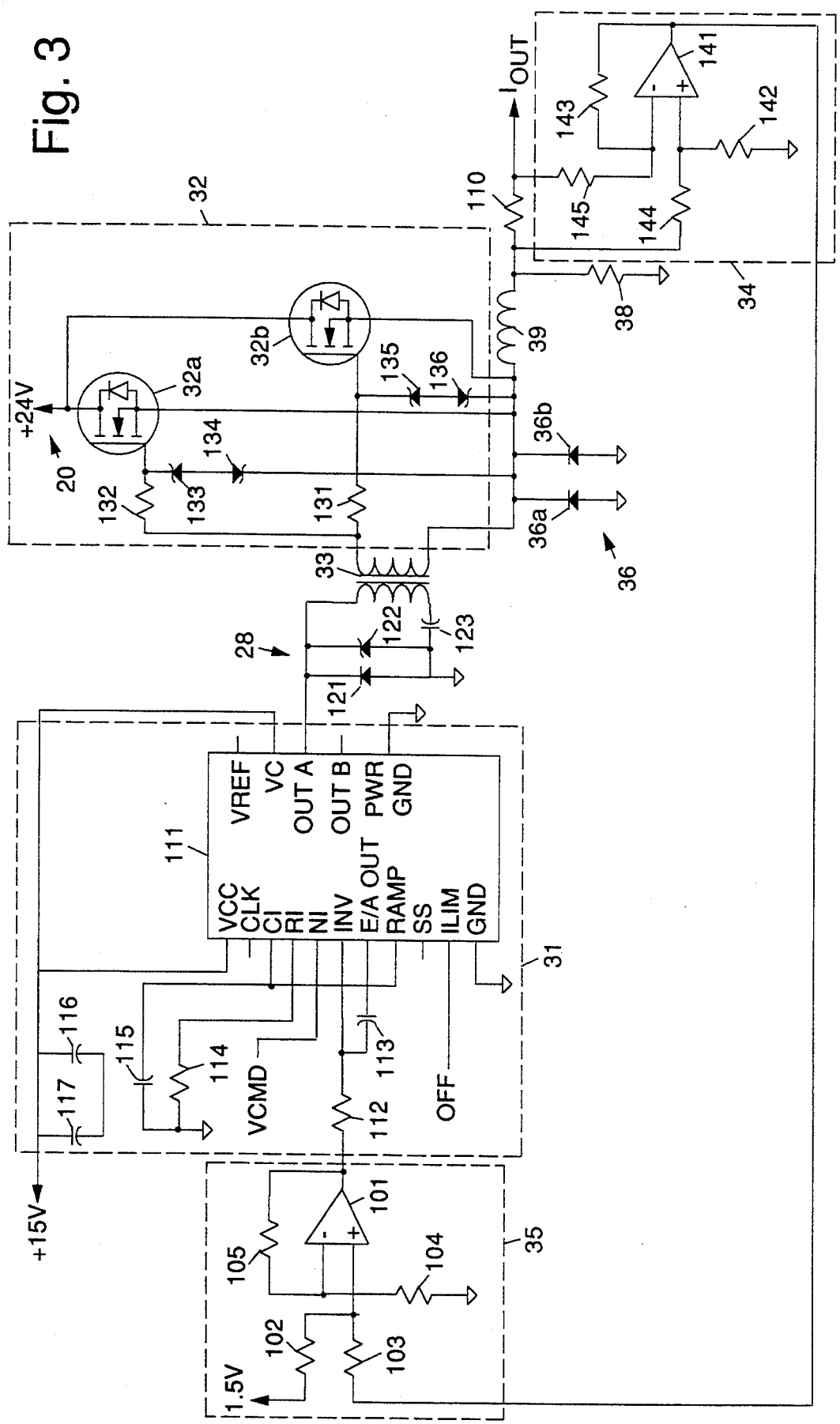
FIG. 3 illustrates a detailed diagram of the current driver circuit of the controller of FIG. 1.
Figure 4:
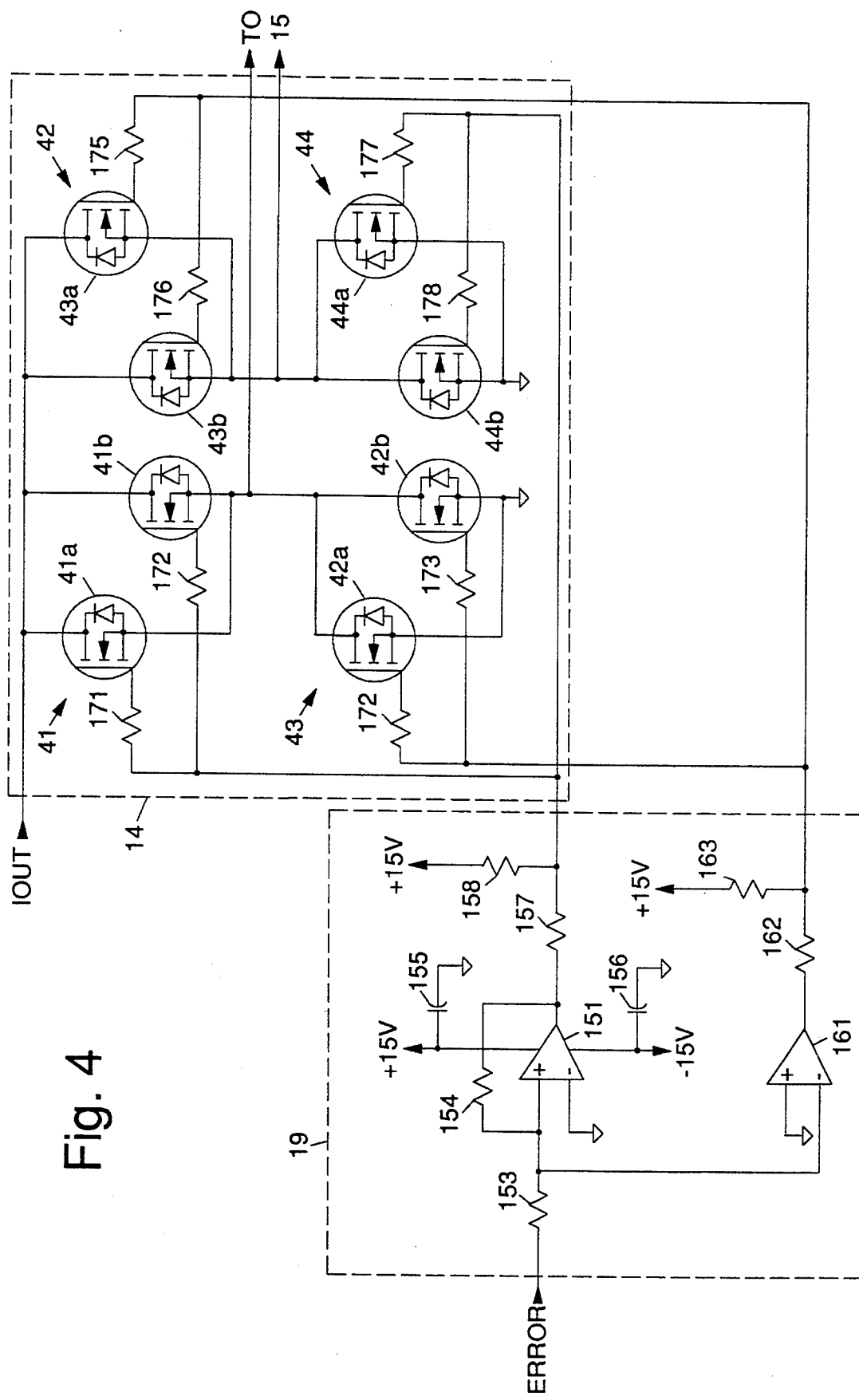
FIG. 4 illustrates a detailed diagram of the comparator and H-bridge circuit of the controller of FIG. 1.

FIGS. 2, 3, and 4 show detailed diagrams of portions of the controller 10. More specifically, FIG. 2 illustrates a detailed diagram of the buffer and level shift circuit 18 and error amplifier 12 of the controller 10 of FIG. 1. The buffer and level shift circuit 18 includes an operational amplifier 45 whose input are a 5 volt reference voltage signal and an input from the temperature sensor 16. An input shunt resistor 46 is provided to set a constant current in the temperature sensor 16. Plus and minus 15 volt power is supplied to drive the operational amplifier 45 that is filtered by two capacitors 47, 48.

The output of the operational amplifier 45 and a 5 volt reference signal are combined and applied to a differential amplifier 51. Plus and minus 15 volt power is supplied to drive the differential amplifier 51 that is filtered by two capacitors 55, 58. A resistive feedback network and voltage divider network are coupled to the differential amplifier 51 that comprise a plurality of resistors 52, 53, 54, 56, 57, connected as shown.

The output of the differential amplifier 51 provides an output feedback signal that is coupled through a resistor 63 to the process controller interface 11, and the output feedback signal is applied to the error amplifier circuit 12. The error amplifier circuit 12 is comprised of an operational amplifier 61 whose inputs are the temperature command (TEMP CMD) signal and the output feedback signal from the differential amplifier 51. A feedback capacitor 67 is provided for the operational amplifier 61.

The output of the the operational amplifier 61 is an error signal (ERROR) which is coupled to an absolute value circuit 70. The absolute value circuit 70 is comprised of two operational amplifiers 71, 81 five resistors 72, 73, 74, 78, 82 and two diodes 75, 76, interconnected as shown. The output of the absolute value circuit 70 is coupled to the current command clamp circuit 25 which comprises three resistors 92, 93, 94 and a shunt regulator 91, interconnected as shown. The output of the current command clamp circuit 25 and a ±1.5 volt reference voltage signal are coupled to a buffer and level shift circuit 95 which comprises an operational amplifier 96 and a feedback network comprising four resistors 97, 98, 99, 100 connected as shown. The output of the buffer and level shift circuit 95 comprises the VCMD output of the error amplifier 12.

FIG. 3 illustrates a detailed diagram of the current driver circuit 13 employed in the controller 10 of FIG. 1. The current driver circuit 13 is comprised of the buffer and level shift circuit 35 which comprises an operational amplifier 101 including a plurality of input, voltage divider and feedback resistors 102, 103, 104, 105, interconnected as shown. The input to the buffer and level shift circuit 35 is a feedback signal from the current sense circuit 34 level shifted relative to a 1.5 volt voltage input signal. The output of the buffer and level shift circuit 35 is coupled by a resistor 112 to a pulsewidth modulation circuit 111. The pulsewidth modulation circuit 111 processes input signals comprising the VCMD signal derived from the error amplifier 12 and the current sense feedback signal. The pulsewidth modulation circuit 111 may be a UC1825 pulsewidth modulation circuit, manufactured by Unitrode, for example, and connected as shown.

The output of the pulsewidth modulation circuit 111 is coupled through a capacitor 123 to the isolation transformer 33. The output of the isolation transformer 33 is coupled to the MOSFET switch 32, which comprises a pair of MOSFET switches 32a, 32b having appropriate input resistors 131, 132 and diodes 133, 134, 135, 136 coupled thereto. Output diodes 36a, 36b and an output filter comprising an inductor 39 are coupled to the MOSFET switch 32. The filtered output current is coupled through a current sense resistor 110 as the IOUT signal to the H-bridge circuit 14. The current sense circuit 34 comprises an operational amplifier 141, a feedback resistor 143 and a voltage divider resistor 142. The current sense circuit 34 processes the IOUT signal to provide the feedback signal that is coupled to the buffer and level shift circuit 35.

FIG. 4 illustrates a detailed diagram of the comparator 19 and H-bridge circuit 14 employed in the controller 10 of FIG. 1. The comparator 19 is comprised of two comparators 151,161, that process the ERROR signal generated by the error amplifier 13. Hysteresis is provided by two resistors 154, 153. Plus and minus 15 volt power is supplied to drive the comparators 151, 161 which is filtered by two capacitors 155, 156. The outputs of the comparators 151, 161 are coupled by two resistor networks comprising resistors 157, 158, 162, 163, and the comparator 19, to the H-bridge circuit 14. The H-bridge circuit 14 is comprised of four pairs of MOSFET switches 41, 43, 42, 44, which are resistively bridged together by way of a plurality of resistors 171-178. The output of the H-bridge circuit 14 comprise heating and cooling current that is coupled to the thermoelectric cooler 15.

The basic operation of the controller 10 may be best understood with reference to FIG. 1. The temperature (VTEMP) of the thermoelectric cooler 15 is sensed by the temperature sensor 16 and compared with a temperature set point (VSET) which corresponds to the TEMP CMD input signal. The temperature set point is the average of a pulsewidth modulated signal produced by the process controller interface 11. The error signal (ERROR) is fed into a buck converter circuit which is configured as a current source or driver 13. The output current from the current driver 13 is proportional to the amplitude of the error signal. This output current is switched through the thermoelectric cooler 15 by the H-bridge circuit 14. The direction of current flow is determined by the comparator 19, which turns on one set of MOSFET switches 41, 42 when VSET is greater than VTEMP, and the other of field effect transistors MOSFETs 43, 44 when VTEMP is greater than VSET.

The current supplied to the thermoelectric cooler 15 is sensed by the voltage across the sense resistor 110 in the current sense circuit 34. This current is compared to a voltage input signal, VCMD, and the current is adjusted to meet this voltage. The VCMD input signal is the current command, and corresponds to the desired output current. It is determined as the difference between the desired temperature input, and the actual temperature of the thermoelectric cooler 15. When the two voltages are equal, there must be some current flowing through the the thermoelectric cooler 15 but this current varies with ambient temperature. Therefore, there is no DC coupled path from the two temperature voltages to VCMD. The operational amplifiers 71, 81 in the absolute value circuit 70 are configured as a standard rectifier circuit. The bipolar error signal must be made positive unipolar to be compatible with the pulsewidth modulator circuit 31 in the current driver 13. As the difference between the set temperature and the actual temperature (the error) decreases, VCMD decreases, and the output current decreases. When the error is 0 volts, the ERROR signal switches the direction of current flow through the the thermoelectric cooler 15, by switching on one pair of MOSFET switches 43, 44, and switching off the other pair of MOSFET switches 41, 42. Since VCMD is 0 volts when the error is 0 volts, undue stress on the switches 41, 42, 43, 44 and/or the thermoelectric cooler 15 is minimized. As the error signal continues to change, the polarity of the signal changes. However, the absolute value (rectifier) circuit 70 keeps the polarity positive, since the pulsewidth modulator circuit 31 accepts only positive voltages. As the error decreases, that is, becomes more negative, the current command (VCMD) increases, and the current provided to the thermoelectric cooler 15 increases. This causes the thermoelectric cooler 15 to heat (or cool) more quickly, sending the actual temperature back towards the set temperature.

The current drive circuit 13 derives its output power from the positive, unipolar voltage source 20. The converter controlled output is the output current, as detected through the current sense resistor 110. Thus the pulsewidth modulator circuit 31 controls the output current only, regardless of the voltage. This also acts as a current limit, in the event of a shorted output.

The controller 10 shown in FIGS. 1-4 has been built and tested in a laboratory and behaves as detailed above. The details of this specific embodiment are given below. The temperature of the thermoelectric cooler 15 is derived from the temperature sensor 16 (a thermistor) placed on the cooler 15. The thermistor value ranges from 848 ohms at −40 degrees Celsius, to 1189 ohms as +50 degrees Celsius. A constant current of 1 mA is provided to the temperature sensor 16 by the operational amplifier 45. The output of the amplifier 45 is V=(1 mA)(Rthermistor)+5 V. This voltage ranges from +5 V to +6.19 V. An offset and gain factor is then added with the differential amplifier 51, so that the output (VTEMP) is VTEMP=(14.605 mV/ohm) Rthermistor−12.380.

This yields a voltage of 0 V to +5 V for a temperature range of −40° C. to +50° C. VTEMP is then compared with VSET in the operational amplifier 61 to generate the temperature error signal (ERROR). the ERROR signal is fed to the comparators 151, 161 to generate the H-bridge signal (HEAT/COOL).

The error signal varies from approximately +14 V to −14 V. The input to the pulsewidth modulator 31 must be a positive signal only, with an upper limit of about 7 V. The operational amplifiers 71, 81 in the absolute value circuit 70 are configured to have an output equal to the absolute value of the input. The output amplitude (VCMD) is clamped by the current command clamp circuit 25 which forms an adjustable shunt regulator, set to a voltage of 3.79 V maximum, and 3.65 V minimum.

The thermoelectric cooler 15 is a resistive load with cooling and heating proportional to the current flow through the cooler 15. To provide the requisite current source, a buck regulator scheme is utilized in the controller 10, using sensed current feedback.

The current flowing in the output (lOUT) is sensed by the current sense resistor 110. The current sense amplifier generates a voltage equal to twice the output current. This voltage is fed back to the pulsewidth modulator circuit 31. The pulsewidth modulator circuit 31 is set up such that the current (1OUT) provided to the cooler 15 is ½ the command signal (VCMD). The lowest maximum current to the cooler 15 will be 1.825 amps, while the highest maximum current will be 1.985 amps.

The MOSFET switches 41-44 in the H-bridge circuit 14 are controlled by an open collector comparator circuit 19 provided by the comparators 151, 161, pulled up to +15 V. The first comparator 151 is controlled by a positive error signal. The second comparator 161 is controlled by a negative error signal. This ensures that both sides of the H-bridge circuit 14 are not turned on at the same time, except possibly during the actual switching of the MOSFET switches 41-44.

For the purposes of completeness the values or identifications of components used in the circuits shown in FIGS. 2-4 are provided below. FIG. 2: amplifier 45=OP400A, resistor 46=4.99 Kohm, capacitor 47=0.1 μF, amplifier 51=LM148, resistor 52=1.0 Kohm, resistor 53=16.5 Kohm, resistor 54=549 ohm, capacitor 55=0.1 μF, resistor 56=4.64 Kohm, resistor 57=182 ohm, capacitor 58=0.1 μF, amplifier 51=LM148, resistor 63=10 Kohm, amplifier 71=LM148, resistor 72=10 Kohm, resistor 73=10 Kohm, resistor 74=10 Kohm, diodes 75, 76=1N4150, resistor 78=10 Kohm, amplifier 81=LM148, resistor 82=10 Kohm, diode 91=TL431M, 10 Kohm, resistor 92=866 ohm, resistor 93=30.1 Kohm, resistor 94=30.1 Kohm, amplifier 96=OP400A, resistor 97=10 Kohm, resistor 98=10 Kohm, resistor 99=10 Kohm, resistor 100=10 Kohm. FIG. 3: amplifier 101=LM148, resistor 102=10 Kohm, resistor 103=10 Kohm, resistor 104=1.0 Kohm, resistor 105=10 Kohm, pulsewidth modulation circuit 111=UC1825, resistor 112=10 Kohm, capacitor 113=0.033 μF, resistor 114=10 Kohm, capacitor 115=1800 μF, diode 121=1N4150, diode 122=1N5711, capacitor 113=1 μF, transformer=1:100, resistor 131=10 ohm, resistor 132=10 ohm, diode 133=1N9688, diode 134=1N9688, diode 135=1N9688, diode 136=1N9688, diode 133=1N9688, diode 134=1N9688, diode 36a=1N5811, diode 36b=1N5811, inductor 39=347 μH, resistor 38=39 ohm, resistor 103=0.10 ohm, amplifier 141=LM148, resistor 142=20 Kohm, resistor 143=20 Kohm, resistor 144=1 Kohm, resistor 145=1 Kohm. FIG. 4: comparator 151=LM139, resistor 153=1 Kohm, resistor 154=1 Kohm, capacitor 155=0.1 μF, capacitor 156=0.1 μF, resistor 157=4.99 Kohm, resistor 158=4.99 Kohm, comparator 161=LM139, resistor 162=4.99 Kohm, resistor 163=4.99 Kohm, resistor 171-178=10 ohm, and MOSFETs 41a, 41b, 42a, 42b, 43a, 43b, 44a, 44b=IRFF130.

Thus there has been described a new and improved tracking system and detector employing an improved thermal reference source and controller therefor. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A temperature controller for controlling the temperature of a device, said controller comprising:
 a temperature sensor coupled to the device that provides a temperature feedback signal;
 an error amplifier for comparing a temperature command (TEMP CMD) with a feedback signal from the temperature sensor and for generating a positive polarity output current command signal (VCMD);
 a current driver coupled to the error amplifier for providing an output current equal to one-half the current command signal;
 an H-bridge circuit coupled between the current driver and the device for switching the direction of current flow in the device, as required to heat and cool it; and
 a comparator coupled to the error amplifier and the H-bridge circuit, for controlling the current supplied by the H-bridge circuit to the device.

2. The apparatus of claim 1 wherein the current driver comprises:
 a MOSFET switch;
 a pulsewidth modulation circuit coupled to the error amplifier for providing an output current proportional to the error amplifier output voltage; and
 a current sense circuit coupled between the output filter inductor and the output of the H-bridge circuit to provide current feedback.

3. The apparatus of claim 2 wherein the current driver further comprises a buffer and level shift circuit coupled between the current sense circuit and the pulsewidth modulation circuit.

4. The apparatus of claim 2 further comprising a filter coupled between the output of the MOSFET switch and the H-bridge circuit.

5. The apparatus of claim 1 wherein the error amplifier comprises:
 an absolute value circuit for determining the absolute value of the error signal;
 a current command clamp circuit coupled to the output of the absolute value circuit; and
 a buffer and level shift circuit coupled to the current command clamp circuit for generating the positive polarity current command signal (VCMD).

6. The apparatus of claim 5 further comprising a buffer and level shift circuit coupled between the temperature sensor and the error amplifier.

7. The apparatus of claim 1 wherein the H-bridge circuit is comprised of two pair of MOSFET switches that are coupled between the output of the current drive circuit and inputs of the device.

8. A controller for controlling the temperature of a thermal reference source, said controller comprising:
 a thermoelectric cooler comprising a thermal reference source for providing heat output;
 a temperature sensor coupled to the thermoelectric cooler that provides a temperature feedback signal;
 an error amplifier that compares a temperature command (TEMP CMD) with a feedback signal and generates a positive polarity output current command signal (VCMD);
 a current driver coupled to the error amplifier for providing an output current equal to one-half the current command signal;
 an H-bridge circuit coupled between the current driver and the thermoelectric cooler for switching the direction of current flow in the thermoelectric cooler, thus heating and cooling it; and
 a comparator coupled to the error amplifier and the H-bridge circuit, for controlling the current supplied by the H-bridge circuit to the thermoelectric cooler.

9. The controller of claim 8 wherein the current driver comprises:
 a MOSFET switch;
 a pulsewidth modulation circuit coupled to the error amplifier for providing an output current proportional to the error amplifier output voltage; and
 a current sense circuit coupled between the output filter inductor and the output of the H-bridge circuit to provide current feedback.

10. The controller of claim 9 further comprising a buffer and level shift circuit coupled between the temperature sensor and the error amplifier.

11. The apparatus of claim 9 further comprising a filter coupled between the output of the MOSFET switch and the H-bridge circuit.

12. The controller of claim 8 wherein the error amplifier comprises:
 an absolute value circuit for determining the absolute value of the error signal;
 a current command clamp circuit coupled to the output of the absolute value circuit; and a buffer and level shift circuit coupled to the current command clamp circuit for generating the positive polarity current command signal (VCMD).

13. The controller of claim 8 wherein the H-bridge circuit is comprised of two pairs of MOSFET switches that are coupled between the output of the current drive circuit and inputs of the thermoelectric cooler.

14. The controller 10 of claim 12 further comprising a buffer and level shift circuit coupled between the temperature sensor and the error amplifier.

15. A thermal reference source comprising:
a thermoelectric cooler for providing heat output;
a temperature sensor coupled to the thermoelectric cooler that provides a temperature feedback signal;
an error amplifier that compares a temperature command (TEMP CMD) with a feedback signal and generates a positive polarity output current command signal (VCMD);
a current driver coupled to the error amplifier for providing an output current equal to one-half the current command signal;
an H-bridge circuit coupled between the current driver and the thermoelectric cooler for switching the direction of current flow in the thermoelectric cooler, thus heating and cooling it; and
a comparator coupled to the error amplifier and the H-bridge circuit, for controlling the current supplied by the H-bridge circuit to the thermoelectric cooler.

16. The thermal reference source of claim 15 wherein the current driver comprises:
a MOSFET switch;
a pulsewidth modulation circuit coupled to the error amplifier for providing an output current proportional to the error amplifier output voltage; and
a current sense circuit coupled between the output filter inductor and the output of the H-bridge circuit to provide current feedback.

17. The thermal reference source of claim 16 wherein the current driver further comprises a buffer and level shift circuit coupled between the current sense circuit and the pulsewidth modulation circuit.

18. The thermal reference source of claim 16 further comprising a filter coupled between the output of the MOSFET switch and the H-bridge circuit.

19. The thermal reference source of claim 15 wherein the error amplifier comprises:
an absolute value circuit for determining the absolute value of the error signal;
a current command clamp circuit coupled to the output of the absolute value circuit; and
a buffer and level shift circuit coupled to the current command clamp circuit for generating the positive polarity current command signal (VCMD).

20. The thermal reference source of claim 19 further comprising a buffer and level shift circuit coupled between the temperature sensor and the error amplifier.

21. The thermal reference source of claim 15 wherein the H-bridge circuit is comprised of two pair of MOSFET switches that are coupled between the output of the current drive circuit and inputs of the thermoelectric cooler.

22. A thermal calibration system comprising:
a detector;
a thermoelectric cooler for providing heat output to the detector;
a temperature sensor coupled to the thermoelectric cooler that provides a temperature feedback signal;
an error amplifier that compares a temperature command (TEMP CMD) with a feedback signal and generates a positive polarity output current command signal (VCMD);
a current driver coupled to the error amplifier for providing an output current equal to one-half the current command signal;
an H-bridge circuit coupled between the current driver and the thermoelectric cooler for switching the direction of current flow in the thermoelectric cooler, thus heating and cooling it; and
a comparator coupled to the error amplifier and the H-bridge circuit, for controlling the current supplied by the H-bridge circuit to the thermoelectric cooler.

23. The system of claim 22 wherein the current driver comprises:
a MOSFET switch;
a pulsewidth modulation circuit coupled to the error amplifier for providing an output current proportional to the error amplifier output voltage; and
a current sense circuit coupled between the output filter inductor and the output of the H-bridge circuit to provide current feedback.

24. The system of claim 23 wherein the current driver further comprises a buffer and level shift circuit coupled between the current sense circuit and the pulsewidth modulation circuit.

25. The system of claim 23 further comprising a filter coupled between the output of the MOSFET switch and the H-bridge circuit.

26. The system of claim 22 wherein the error amplifier comprises:
an absolute value circuit for determining the absolute value of the error signal;
a current command clamp circuit coupled to the output of the absolute value circuit; and
a buffer and level shift circuit coupled to the current command clamp circuit for generating the positive polarity current command signal (VCMD).

27. The system of claim 26 further comprising a buffer and level shift circuit coupled between the temperature sensor and the error amplifier.

28. The system of claim 22 wherein the H-bridge circuit is comprised of two pairs of MOSFET switches that are coupled between the output of the current drive circuit and inputs of the thermoelectric cooler.

* * * * *